(12) United States Patent
Zhao et al.

(10) Patent No.: US 10,496,466 B2
(45) Date of Patent: Dec. 3, 2019

(54) PREPROCESSOR OF ABNORMALITY SIGN DIAGNOSING DEVICE AND PROCESSING METHOD OF THE SAME

(71) Applicant: Hitachi Power Solutions Co., Ltd., Hitachi-shi, Ibaraki (JP)

(72) Inventors: Pushe Zhao, Tokyo (JP); Junichi Tanaka, Tokyo (JP); Masaru Kurihara, Tokyo (JP); Toujirou Noda, Hitachi (JP); Shigeyoshi Chikuma, Hitachi (JP)

(73) Assignee: Hitachi Power Solutions Co., Ltd., Hitachi-shi (JP)

( * ) Notice: Subject to any disclaimer, the term of this patent is extended or adjusted under 35 U.S.C. 154(b) by 759 days.

(21) Appl. No.: 15/183,935

(22) Filed: Jun. 16, 2016

(65) Prior Publication Data

US 2016/0371137 A1    Dec. 22, 2016

(30) Foreign Application Priority Data

Jun. 22, 2015  (JP) .................................. 2015-124872

(51) Int. Cl.
*G06F 11/07*    (2006.01)
*G06N 99/00*    (2019.01)
(Continued)

(52) U.S. Cl.
CPC ........ *G06F 11/079* (2013.01); *G06F 11/0709* (2013.01); *G06F 11/0751* (2013.01);
(Continued)

(58) Field of Classification Search
CPC ............... G06F 11/079; G06F 11/0787; G06F 11/0709; G06F 11/0751; G06F 17/153; G06F 17/175; G06N 20/00
See application file for complete search history.

(56) References Cited

U.S. PATENT DOCUMENTS

| | | | | |
|---|---|---|---|---|
| 4,633,467 A | * | 12/1986 | Abel ..................... | G06F 11/079 714/3 |
| 5,548,597 A | * | 8/1996 | Kayama ............... | G05B 23/024 714/736 |

(Continued)

FOREIGN PATENT DOCUMENTS

| | | |
|---|---|---|
| JP | 2013-8111 A | 1/2013 |
| JP | 2014-238852 A | 12/2014 |

OTHER PUBLICATIONS

Extended European Search Report issued in counterpart European Application No. 16173698.8 dated Dec. 7, 2016 (11 pages).

(Continued)

*Primary Examiner* — Mohammad K Islam
(74) *Attorney, Agent, or Firm* — Crowell & Moring LLP

(57) ABSTRACT

A preprocessor includes a sensor data storage part that is connected to an abnormality sign diagnosing device and stores multi-dimensional sensor data, a data analysis processing part that calculates a variable value by using the multi-dimensional sensor data stored in the sensor data storage part, an analysis data storage part that stores the variable value calculated by the data analysis processing part, and an analysis data addition processing part that combines the multi-dimensional sensor data stored at the sensor data storage part and the variable value stored in the analysis data storage part and outputs a combined result to the abnormality sign diagnosing device.

6 Claims, 14 Drawing Sheets

(51) Int. Cl.
*G06N 20/00* (2019.01)
*G06F 17/17* (2006.01)
*G06F 17/15* (2006.01)

(52) U.S. Cl.
CPC ........ *G06F 11/0787* (2013.01); *G06F 17/153* (2013.01); *G06F 17/175* (2013.01); *G06N 20/00* (2019.01)

(56) References Cited

U.S. PATENT DOCUMENTS

| | | | | |
|---|---|---|---|---|
| 6,408,259 | B1 * | 6/2002 | Goebel | B64D 43/00 |
| | | | | 701/100 |
| 6,714,925 | B1 * | 3/2004 | Barnhill | G06K 9/6228 |
| | | | | 706/48 |
| 7,127,439 | B2 * | 10/2006 | Jannarone | G06N 20/00 |
| | | | | 706/25 |
| 7,203,431 | B2 * | 4/2007 | Shoji | G06K 15/408 |
| | | | | 399/9 |
| 7,720,771 | B1 * | 5/2010 | Anderson | G06N 20/00 |
| | | | | 706/12 |
| 7,783,581 | B2 * | 8/2010 | Hosoi | G06N 20/00 |
| | | | | 706/12 |
| 8,589,334 | B2 * | 11/2013 | Vashist | G06N 20/00 |
| | | | | 706/59 |
| 8,751,414 | B2 * | 6/2014 | Datta | G06F 11/0751 |
| | | | | 706/11 |
| 9,753,801 | B2 * | 9/2017 | Ishii | G06F 11/0754 |
| 2003/0065462 | A1 * | 4/2003 | Potyrailo | G05B 23/0245 |
| | | | | 702/81 |
| 2011/0276828 | A1 | 11/2011 | Tamaki et al. | |
| 2012/0041575 | A1 * | 2/2012 | Maeda | G05B 23/024 |
| | | | | 700/80 |
| 2012/0136629 | A1 * | 5/2012 | Tamaki | G05B 23/0254 |
| | | | | 702/183 |
| 2013/0055037 | A1 * | 2/2013 | Nonogaki | G06F 11/3688 |
| | | | | 714/48 |
| 2013/0073261 | A1 * | 3/2013 | Kim | G06K 9/6289 |
| | | | | 702/189 |
| 2014/0095016 | A1 * | 4/2014 | Suganuma | G07C 5/00 |
| | | | | 701/32.1 |
| 2014/0195184 | A1 * | 7/2014 | Maeda | G01D 18/006 |
| | | | | 702/85 |
| 2014/0195868 | A1 * | 7/2014 | Hasegawa | G06F 11/076 |
| | | | | 714/724 |
| 2015/0095719 | A1 * | 4/2015 | Namkoong | G06F 11/008 |
| | | | | 714/47.3 |
| 2015/0160098 | A1 * | 6/2015 | Noda | G05B 23/024 |
| | | | | 702/35 |
| 2016/0169771 | A1 * | 6/2016 | Hiruta | G05B 23/0243 |
| | | | | 702/183 |
| 2016/0209838 | A1 * | 7/2016 | Uchida | G07C 5/008 |
| 2016/0231738 | A1 * | 8/2016 | Kato | G05B 23/0243 |
| 2018/0011480 | A1 * | 1/2018 | Hiruta | G05B 23/0227 |

OTHER PUBLICATIONS

Pyayt, "Chapter 3. Data Analysis and Anomaly Detection Approach", PhD Thesis: "Data-Driven Methods in Application to Flood Defence Systems Monitoring and Analysis", Sep. 1, 2014, vol. 16, pp. 19-41, XP055324754.

Brauckhoff et al., "A Signal Processing View on Packet Sampling and Anomaly Detection", INFOCOM, 2010 Proceedings IEEE, Mar. 14, 2010, pp. 1-9, XP031675041.

Pham et al., "Anomaly Detection in Large-Scale Data Stream Networks", Data Mining and Knowledge Discovery, Dec. 2, 2012, pp. 1-38, XP055092864.

Shevertalov et al., "Using Search Methods for Selecting and Combining Software Sensors to Improve Fault Detection in Autonomic Systems", 2$^{nd}$ International Symposium on Search Based Software Engineering, IEEE, Sep. 7, 2010, pp. 120-129, XP031801118.

* cited by examiner

FIG. 7

SENSOR DATA

| TIME (s) | SENSOR #1 | SENSOR #2 | SENSOR #3 |
|---|---|---|---|
| ... | ... | ... | ... |
| 3610 | 0.14 | 526 | 1.3 |
| 3640 | 0.16 | 528 | 1.5 |
| 3670 | 0.14 | 533 | 1.3 |
| 3700 | 0.14 | 525 | 1.3 |
| 3730 | 0.16 | 532 | 1.4 |
| ... | ... | ... | ... |

CORRELATION COEFFICIENT

| TIME (s) | CORRELATION COEFFICIENTS #1 AND #3 |
|---|---|
| ... | ... |
| 3610 | 0.87 |
| 3640 | 0.86 |
| 3670 | 0.82 |
| 3700 | 0.88 |
| 3730 | 0.85 |
| ... | ... |

DATA TO WHICH CORRELATION COEFFICIENT IS ADDED

| TIME (s) | SENSOR #1 | SENSOR #2 | SENSOR #3 | CORRELATION COEFFICIENTS #1 AND #3 |
|---|---|---|---|---|
| ... | ... | ... | ... | ... |
| 3610 | 0.14 | 526 | 1.3 | 0.87 |
| 3640 | 0.13 | 528 | 1.5 | 0.86 |
| 3670 | 0.14 | 533 | 1.3 | 0.82 |
| 3700 | 0.14 | 525 | 1.3 | 0.88 |
| 3730 | 0.15 | 532 | 1.3 | 0.85 |
| ... | ... | ... | ... | ... |

FIG. 12

SENSOR DATA

| TIME (s) | SENSOR A | SENSOR B |
|---|---|---|
| ... | ... | ... |
| 3610 | xxx | xxx |
| 3640 | xxx | xxx |
| 3670 | xxx | xxx |
| 3700 | xxx | xxx |
| 3730 | xxx | xxx |
| ... | ... | ... |

CORRELATION COEFFICIENT

| TIME (s) | CORRELATION COEFFICIENTS A AND B |
|---|---|
| ... | ... |
| 3610 | xxx |
| 3640 | xxx |
| 3670 | xxx |
| 3700 | xxx |
| 3730 | xxx |
| ... | ... |

DATA TO WHICH CORRELATION COEFFICIENT IS ADDED

| TIME (s) | SENSOR A | SENSOR B | CORRELATION COEFFICIENTS A AND B |
|---|---|---|---|
| ... | ... | ... | ... |
| 3610 | xxx | xxx | xxx |
| 3640 | xxx | xxx | xxx |
| 3670 | xxx | xxx | xxx |
| 3700 | xxx | xxx | xxx |
| 3730 | xxx | xxx | xxx |
| ... | ... | ... | ... |

SENSOR DATA

| TIME (s) | GENERATED ELECTRIC POWER |
|---|---|
| ... | ... |
| 3610 | xxx |
| 3640 | xxx |
| 3670 | xxx |
| 3700 | xxx |
| 3730 | xxx |
| ... | ... |

STANDARD DEVIATION

| TIME (s) | STANDARD DEVIATION |
|---|---|
| ... | ... |
| 3610 | xxx |
| 3640 | xxx |
| 3670 | xxx |
| 3700 | xxx |
| 3730 | xxx |
| ... | ... |

DATA TO WHICH STANDARD DEVIATION IS ADDED

| TIME (s) | GENERATED ELECTRIC POWER | STANDARD DEVIATION |
|---|---|---|
| ... | ... | ... |
| 3610 | xxx | xxx |
| 3640 | xxx | xxx |
| 3670 | xxx | xxx |
| 3700 | xxx | xxx |
| 3730 | xxx | xxx |
| ... | ... | ... |

PREPROCESSOR OF ABNORMALITY SIGN DIAGNOSING DEVICE AND PROCESSING METHOD OF THE SAME

CLAIM OF PRIORITY

The present application claims priority from Japanese application serial no. JP2015-124872, filed on Jun. 22, 2015, the content of which is hereby incorporated by reference into this application.

BACKGROUND OF THE INVENTION

1. Field of the Invention

The present invention relates to a preprocessor to be connected to an abnormality sign diagnosing device and a processing method of the same.

2. Description of the Related Art

In a plant including various kinds of devices, or in various kinds of facilities, highly reliable operation over a long term is required. However, in such devices, any factors such as environment or an operational state cause various kinds of troubles. Thus, it is important to grasp a change in state of the devices or the troubles in advance.

To respond to the above-mentioned requirements, JP-2013-8111-A and JP-2014-238852-A describe an art that disposes various kinds of sensors in a device and uses sensor values thereof or a correlation between the sensors (correlation between the sensor values) to monitor an operational state.

JP-2013-8111-A describes an abnormality sign diagnosing device and an abnormality sign diagnosing method capable of diagnosing the presence or absence of an abnormality sign appropriately. JP-2013-8111-A acquires multi-dimensional sensor data measured by a plurality of sensors disposed in a machinery and uses sensor data of the machinery working normally as learning data to produces a case model. Then, the presence or absence of an abnormality sign is diagnosed based on the degree of abnormality which represents the degree of deviation from the case model.

The case model clusters the sensor data to produce the learning data. The degree of abnormality is such a value that a distance between diagnosis target data and a center of gravity of an affiliation cluster and the diagnosis target data are divided by a cluster radius which is an index indicative of a spread of the affiliation cluster. Herein, the affiliation cluster is a cluster whose center of gravity is located closest to the diagnosis target data among the clusters constituting the case model.

JP-2014-238852-A describes such an art, which is referred to as invariant relation analysis, that the state of a system is analyzed based on deviation of the correlation. The operational management system described in JP-2014-238852-A generates a correlation function indicative of a correlation between multiple pieces of performance information in managed devices. To determine whether the correlation is maintained or not, newly acquired performance information is applied to the correlation function. The correlation function is generated as a relational equation between two pieces of performance information. As an example, with respect to performances x and y, values of "A=–0.6" and "B=100" are calculated in the correlation function expressed by the equation of "y=Ax+B."

SUMMARY OF THE INVENTION

The arts described in JP-2013-8111-A and JP-2014-238852-A diagnose abnormalities and a failure by using either sensor values or a correlation between the sensor values. The art described in JP-2013-8111-A monitors a change in sensor data, thereby obtaining high flexibility and a wide application range. However, since the sensor data is less sensitive to some abnormalities, the abnormalities may not be detected early. The art described in JP-2014-238852-A, which monitors a change in correlation, is necessary to format a correlation function previously. Therefore, its flexibility is low. Consequently, the art described in JP-2014-238852-A can hardly detect any abnormalities other than the previously formatted correlation function.

Thus, art for early detecting an abnormality sign of equipment by using an abnormality sign diagnosing device is desired.

The disclosed preprocessor includes a sensor data storage part that is connected to an abnormality sign diagnosing device and stores multi-dimensional sensor data, a data analysis processing part that calculates a variable value by using multi-dimensional sensor data stored in the sensor data storage part, an analysis data storage part that stores the variable value calculated by the data analysis processing part, and an analysis data addition processing part that combines the multi-dimensional sensor data stored in the sensor data storage part and the variable value stored in the analysis data storage part and outputs the combined result to the abnormality sign diagnosing device.

According to the disclosed preprocessor, the abnormality sign of equipment can early be detected by an abnormality sign diagnosing device.

BRIEF DESCRIPTION OF THE DRAWINGS

FIG. 7 is an exemplary explanation diagram to which a correlation coefficient is added;

FIG. 12 is a diagram describing a data configuration to which a correlation coefficient is added;

DESCRIPTION OF THE PREFERRED EMBODIMENTS

Figure 1:
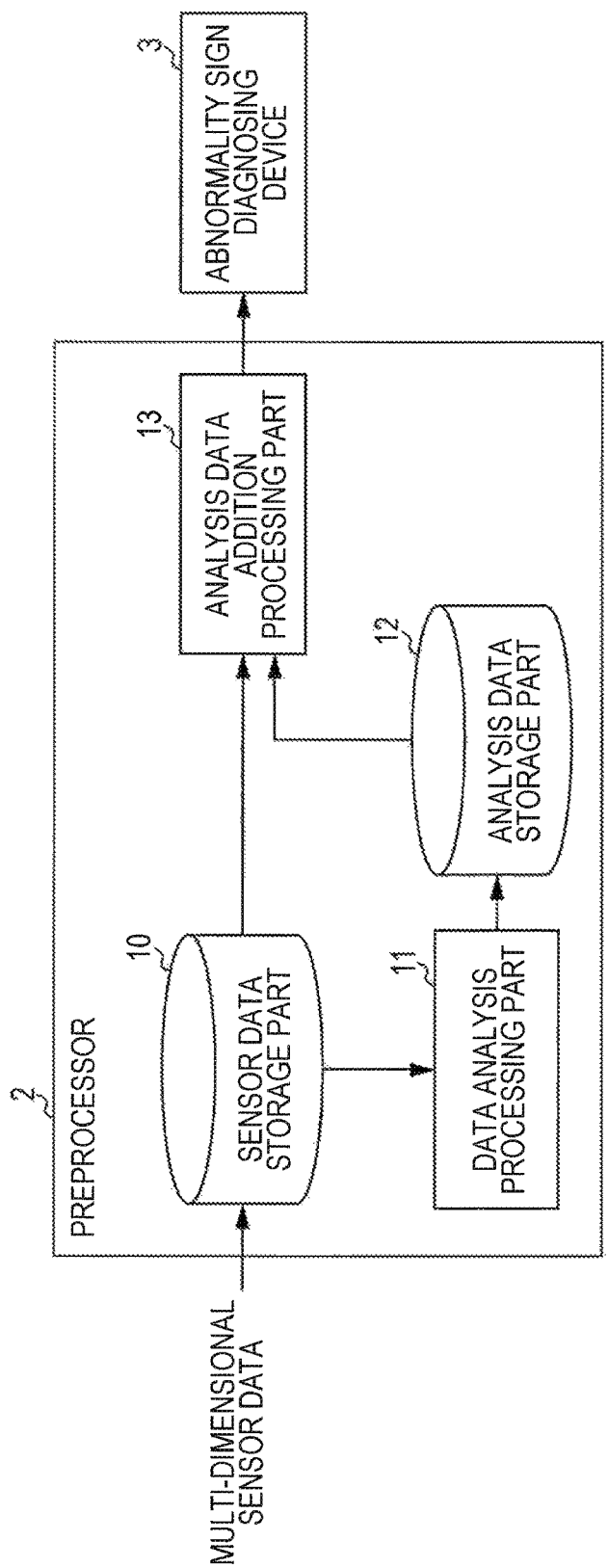
FIG. 1 is an exemplary configuration of a preprocessor.

An embodiment discloses a preprocessor that is connected upstream of or inside an abnormality sign diagnosing device to improve an effect of diagnosing abnormality signs of the device. The preprocessor produces a new variable from input multi-dimensional sensor data, and inputs the multi-dimensional sensor data and the produced new variable to the abnormality sign diagnosing device. Thus, a period of time until abnormality signs are detected is shortened as the effect of diagnosing abnormality signs. The new variable, which reflects a state of the device different from the state of the device diagnosed by using multi-dimensional sensor data, includes a correlation coefficient between the multi-dimensional sensor data, a standard deviation of the multi-dimensional sensor data, and the like.

Sensor values and a correlation coefficient between the sensor values reflect different features of the state of equipment from each other. Thus, when both of the values are used to determine the state of equipment, abnormalities of equipment may be detected early. For instance, since sensors attached to the same equipment are interfered with one another, even if sensor values will not change largely when abnormality occurs, a correlation coefficient between the sensor values may change. In this case, the correlation coefficient between the sensor values can detect the abnormality earlier than each sensor value does. In contrast, in some cases, the sensor value may detect the abnormality earlier than the correlation coefficient does. Accordingly, by combining various kinds of variables such as a sensor value and a correlation coefficient, the effect of diagnosing abnormality signs can be improved.

Note that, the abnormality sign diagnosing device sets a threshold value with respect to each of multi-dimensional sensor data and variables, which are input from the preprocessor (multi-dimensional sensor data and variables are referred to as input data), and compares with the threshold value to detect abnormality of equipment. Alternatively, the abnormality sign diagnosing device calculates the degree of abnormality, which indicates the degree of deviation from a case model representing a normal state of equipment. Then, the abnormality sign diagnosing device sets a threshold value with respect to the degree of abnormality and compares with the threshold value to detect abnormality as described later. The comparison with the threshold value is categorized into three types corresponding to input data or the state of equipment indicated by the degree of abnormality. The first type is the case where the state of equipment is determined to be abnormal when the input data or the degree of abnormality exceeds the threshold value. In this case, the threshold value denotes an upper limit of the input data, which indicates a normal state of equipment, or the degree of abnormality. The second type is the case where the state of equipment is determined to be abnormal when the input data or the degree of abnormality is less than the threshold value. In this case, the threshold value denotes a lower limit of the input data, which indicates a normal state of equipment, or the degree of abnormality. The third type is the case where a first and second threshold values (first threshold value>second threshold value) are provided, and the state of equipment is determined to be abnormal when the input data or the degree of abnormality is more than the first threshold value and less than the second threshold value. In this case, the first threshold value denotes an upper limit of the input data, which indicates a normal state of equipment, or the degree of abnormality, and the second threshold value denotes a lower limit of the input data, which indicates a normal state of equipment, or the degree of abnormality. Whichever the type is employed in setting the threshold value, when the data input into the abnormality sign diagnosing device has an identical form (data format), the logic assembly in comparison of the abnormality sign diagnosing device will be simplified. Accordingly, it is desired that the preprocessor outputs multi-dimensional sensor data and variables to the abnormality sign diagnosing device in an identical form.

Hereinafter, embodiments will be described using the drawings.

First Embodiment

An exemplary preprocessor for adding a correlation coefficient between selected sensor values to sensor data will be described. FIG. 1 is an exemplary configuration of a preprocessor (preprocessing device) 2. The preprocessor 2 is a preprocessing device of an abnormality sign diagnosing device 3, which includes a sensor data storage part 10, a data analysis processing part 11, an analysis data storage part 12, and an analysis data addition processing part 13.

In the preprocessor 2, the data analysis processing part 11 selects a type of correlation coefficient (hereafter, simply referred to as a correlation coefficient or a correlation coefficient between sensors) between sensor values (sensor data) with respect to multi-dimensional sensor data (hereinafter, simply referred to as sensor data) stored in the sensor data storage part 10, and then calculates a correlation coefficient value of the selected type and stores it in the analysis data storage part 12. The analysis data addition processing part 13 reads out the correlation coefficient from the analysis data storage part 12 and outputs it to the abnormality sign diagnosing device 3 while outputting the sensor data from the sensor data storage part 10 to the abnormality sign diagnosing device 3.

Figure 2:
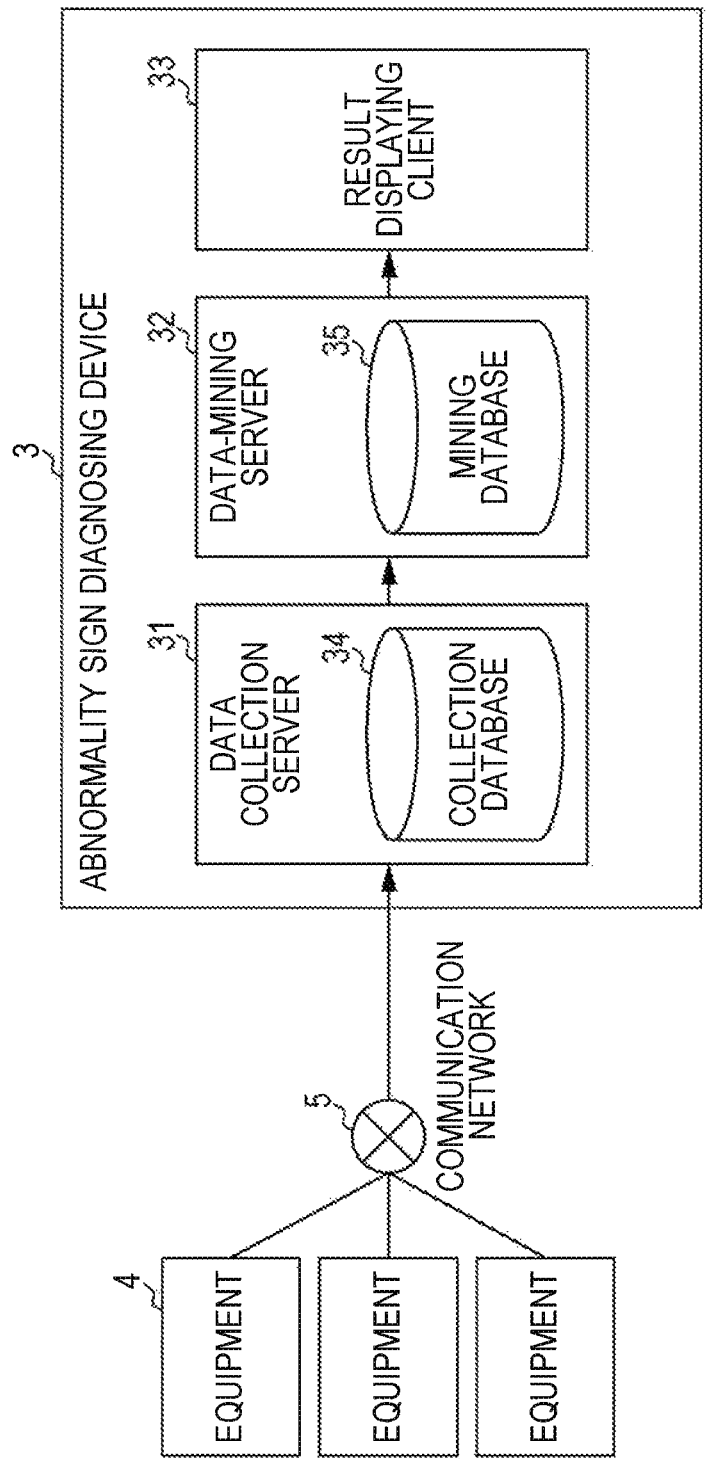
FIG. 2 is an exemplary configuration of an abnormality sign diagnosing device to which no preprocessor is connected.

FIG. 2 is an exemplary configuration of the abnormality sign diagnosing device 3 to which the preprocessor 2 is not connected. Equipment 4 equipped with a plurality of sensors is connected to a communication network 5. The equipment 4 transmits sensor data collected from the sensors to the abnormality sign diagnosing device 3 via the communication network 5. The abnormality sign diagnosing device 3 includes a data collection server 31, a data-mining server 32, and a result displaying client 33. The data collection server 31 has a collection database 34 for storing collected multiple sensor data, i.e., multi-dimensional sensor data. With respect to the input multi-dimensional sensor data, the data-mining server 32 diagnoses an abnormality sign of the equipment 4. The data-mining server 32 has a mining database 35 for storing a diagnostic result of the abnormality sign, or the like. The result displaying client 33 displays the diagnostic result of the abnormality sign.

Figure 3:
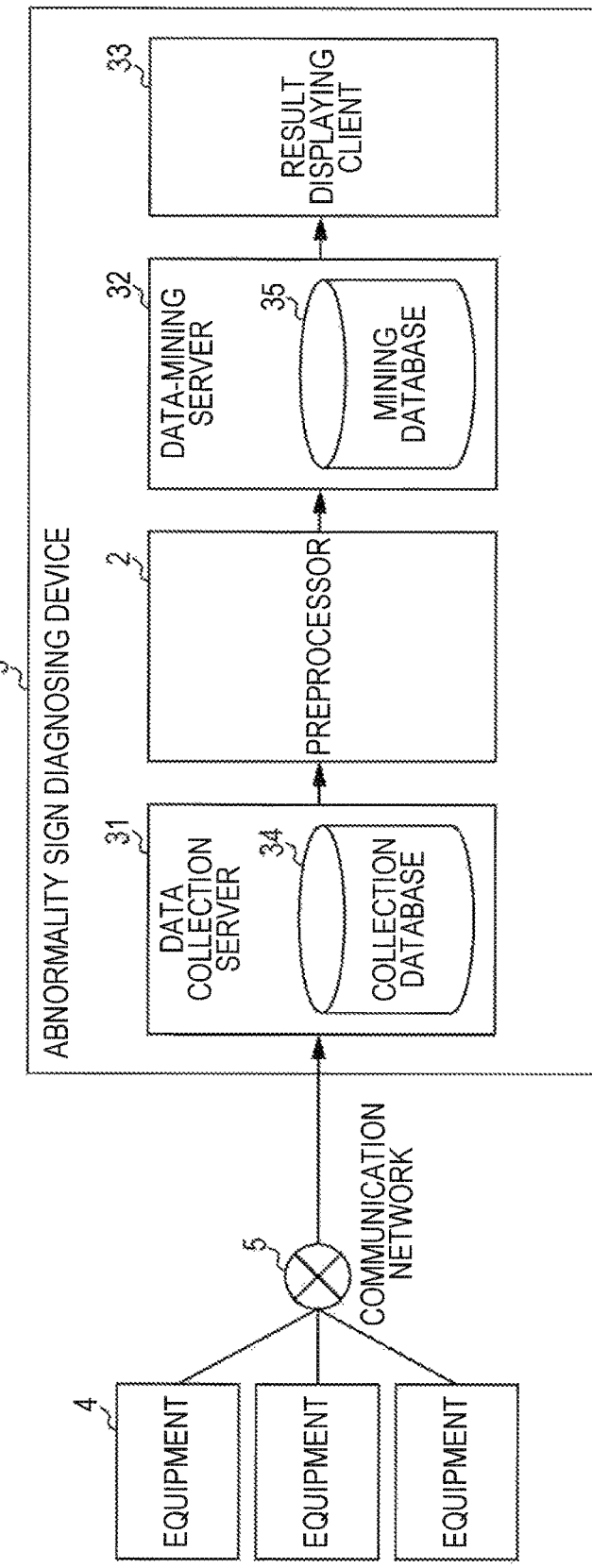
FIG. 3 is an exemplary configuration of the abnormality sign diagnosing device to which a preprocessor is connected.

FIG. 3 is an exemplary configuration of the abnormality sign diagnosing device 3 in which the preprocessor 2 is connected between the data collection server 31 and the data-mining server 32. With the configuration of FIG. 3, the preprocessor 2 adds a new variable value (correlation coefficient value) before the data-mining server 32 diagnoses an abnormality sign based on the sensor data.

The preprocessor 2 may be mounted upstream of the data collection server 31 unlike the configuration shown in FIG. 3. Further, the preprocessor 2 may be directly connected to the equipment 4, or installed in a control part of the equipment 4.

The sensor data storage part 10 of the preprocessor 2 stores sensor data collected from the sensors attached to the equipment 4. Therefore, the sensor data storage part 10 requires a capacity for storing the sensor data. In the configuration shown in FIG. 3, the preprocessor 2 is allowed to use the data collection server 31 of the abnormality sign diagnosing device 3. Thus, the collection database 34 is used as the sensor data storage part 10.

Figure 4:
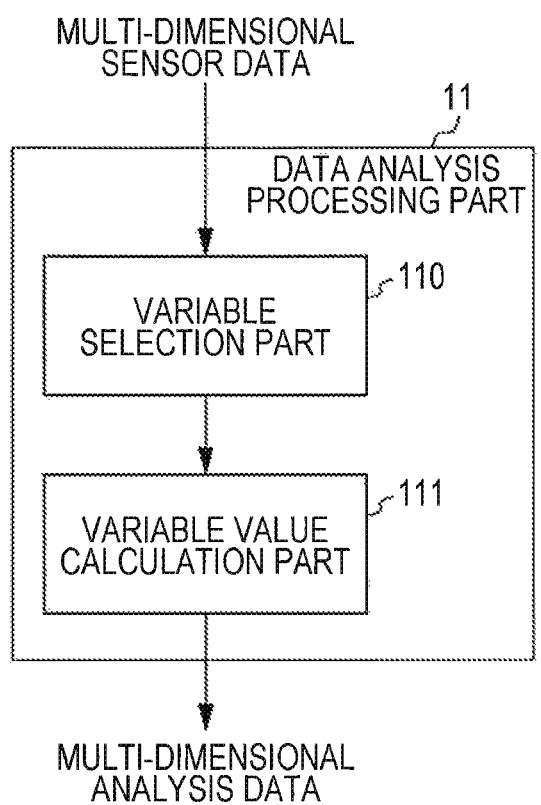
FIG. 4 is a view describing two processing parts included in a data analysis processing part.

FIG. 4 is a view describing two main processing parts included in the data analysis processing part 11. To calculate a correlation coefficient between the selected sensors based on the sensor data, the data analysis processing part 11 has a variable selection part 110 for selecting a desired variable (a part of sensor data) from the sensor data, and a variable value calculation part 111 for calculating a correlation coefficient between the sensors by using the selected valuable. The correlation coefficient calculated by the variable value calculation part 111 is called multi-dimensional analysis data.

Figure 5:
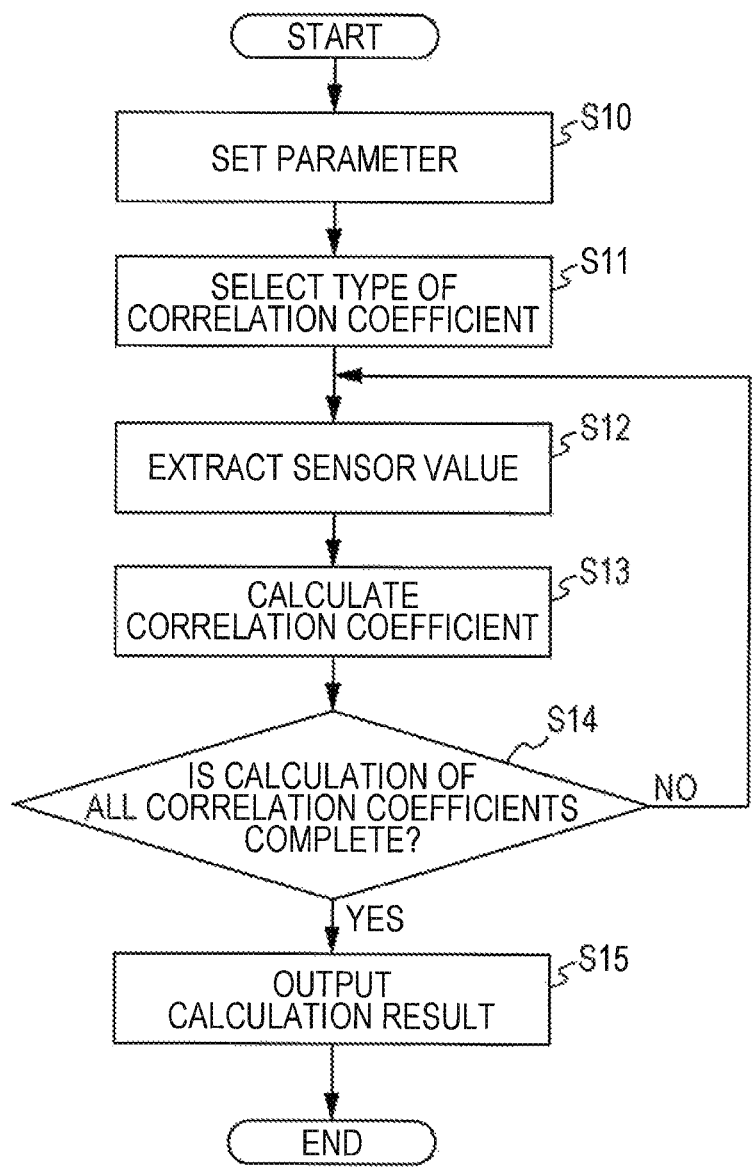
FIG. 5 is a processing flowchart of the data analysis processing part.

FIG. 5 is a processing flowchart of the data analysis processing part 11. The data analysis processing part 11 sets a required parameter (S10). The required parameter is, for example, a calculation period for calculating a standard deviation of sensor values over a certain period of time. The calculation period may be 12 hours, or may be 30 minutes. The parameter can be changed according to features of the sensor data.

The data analysis processing part 11 selects a type of correlation coefficient (S11). The processing of S11 corresponds to the processing of the variable selection part 110 in FIG. 4. The number of correlation coefficients is the number of combinations of sensors. Therefore, in the case where many sensors are employed, calculating all the correlation coefficients therebetween may affect calculation time for diagnosing abnormality signs or its calculation accuracy. For instance, when all the correlation coefficients between 24 sensor data are calculated, calculation of 276 correlation coefficients will be necessary. This requires the number of calculations more than 10 times the number of original sensor data. Thus, the calculation time for diagnosing abnormality signs may increase to from 10 times to about 100 times compared with the case where the correlation coefficient is not used. Further, all the correlation coefficients between sensors do not necessarily reflect an abnormal condition. Therefore, the correlation coefficient is needed to be selected. However, a condition of the selection is difficult to be fixed because sensor data may be subjected to various influences such as an operation state of the equipment 4 or environmental variations. To solve the difficulty, a method of selecting a correlation coefficient will be described below with reference to FIG. 6.

The data analysis processing part 11 extracts a variable (sensor data) corresponding to the selected correlation coefficient (S12), and calculates a correlation coefficient of the variable (S13, S14). The processing steps of S12, S13, and S14 correspond to the processing of the variable value calculation part 111 in FIG. 4. The data analysis processing part 11 reads sensor data, which is required for calculating the correlation coefficient, from the sensor data storage database 10. For instance, in the case where a correlation coefficient between a temperature sensor and a pressure sensor at a certain time is calculated, temperature sensor data and pressure sensor data within a calculation range before the certain time (calculation period specified by parameters) are extracted from the sensor data storage database 10. In this case, the data before the certain time is used for analyzing, but the data analysis processing part 11 may use the data before and after the certain time or the data after the certain time. The data analysis processing part 11 calculates a correlation coefficient by using, for example, the following equation. When a data row including two sets of sensor values $\{(x_i, y_i)\}(i=1, \ldots, n)$ is given, a correlation coefficient is calculated as follows:

$$R = \Sigma((x_i - x_a) \cdot (y_i - y_a)) / (\text{SQRT}(\Sigma(x_i - x_a)2) \cdot \text{SQRT}(\Sigma(y_i - y_a)2))$$

where R is a correlation coefficient value, $x_a$ is an average value of the entire values of $x_i$, $y_a$ is an average value of the entire values of $y_i$, $\Sigma$ is a summation, and SQRT is a square root.

To secure accuracy of a calculation result, the data analysis processing part 11 may perform abnormal value processing, noise processing, or the like before calculating a correlation coefficient. The data analysis processing part 11 calculates all of the selected correlation coefficients and saves the calculation result in the analysis data storage part 12 (S15).

Figure 6:
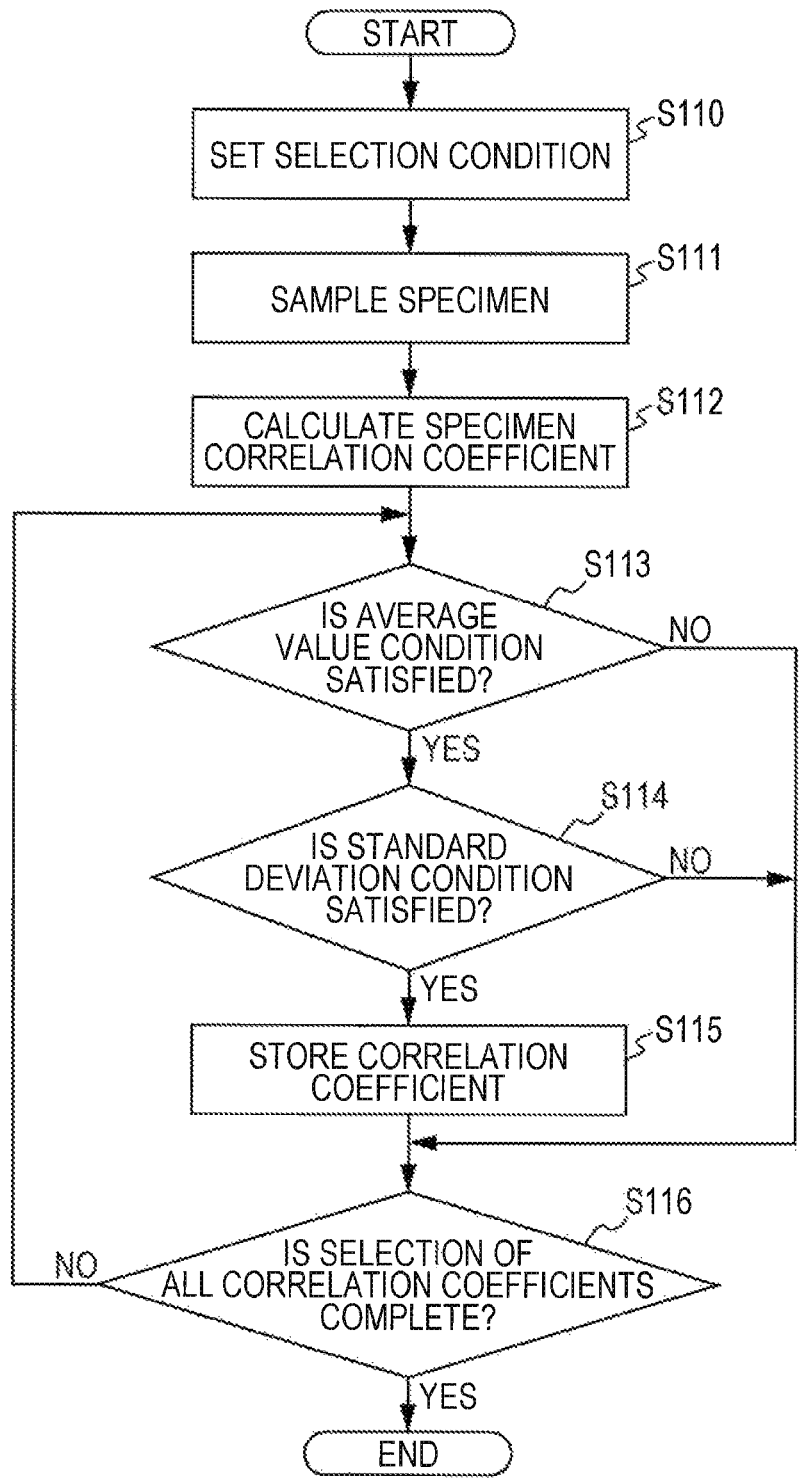
FIG. 6 is a flowchart describing a method of selecting a type of correlation coefficient.

FIG. 6 is a flowchart describing a method of selecting a type of correlation coefficient (type of combination of sensor data for calculating a correlation coefficient). To select a type of correlation coefficient, the data analysis processing part 11 sets up a selection condition (S110). Herein, a correlation coefficient average value, which indicates correlation strength, and a correlation coefficient standard deviation, which indicates correlation stability, are set up as the selection condition. The correlation coefficient average value is an average value of correlation coefficients of the same type within predetermined time. The correlation coefficient standard deviation is a standard deviation of correlation coefficients of the same type within predetermined time. As a determination condition for determining whether the selection condition is satisfied or not, the standard deviation is set to have a threshold value ranging from 0 to 1. For instance, the determination condition is set to have the 15 largest average values and a standard deviation of less than 0.1.

The data analysis processing part 11 calculates a correlation coefficient to determine whether the correlation coefficient satisfies the selection condition or not. However, when all the correlation coefficient values are calculated at every time (every time when sensor data is acquired), it will take a long time to calculate them. Therefore, the data analysis processing part 11 performs specimen sampling (S111). For instance, when sensor data is sampled at a rate of 0.1%, calculation volume is reduced to 1/1000 the calculation volume when all the correlation coefficient values are calculated. As an example, specimen sampling at a rate of 0.1% is described here, but a rate of the specimen sampling may be changed to 1% or 10% according to calculation time. Subsequently, the data analysis processing part 11 calculates a correlation coefficient value of the specimen (S112).

When determining whether a correlation coefficient satisfies the selection condition or not, the data analysis processing part 11 determines an average value condition and a standard deviation condition in turn (S113, S114, S116), and saves the correlation coefficient that satisfies both of the conditions in a correlation coefficient list (S115).

Return back to FIG. 1, the description will be continued. The analysis data addition processing part 13 reads sensor data from the sensor data storage part 10, reads analysis data from the analysis data storage part 12, and produces new data. The analysis data is desired to have an identical form to the sensor data. Accordingly, when the analysis data includes a portion that has a form different from that of the sensor data, supplement or removal of the analysis data is necessary. For instance, when a correlation coefficient at a certain time fails to be calculated due to a lack of sensor data, the correlation coefficient value is supplemented with a predicted value. As for a method of calculating the predicted value, some methods are employed depending on features of sensor data. For instance, when variable values for calculating a correlation coefficient value are continuous, the predicted value of the correlation coefficient is calculated by using an average value of variable values in the vicinity of the lacked data value. Further, when variable values for calculating a correlation coefficient value are random values following a normal distribution, the predicted value of the correlation coefficient is calculated by using an average value of all the calculable variable values (variable values except for a lack of sensor data). Herein, depending on features of sensor data, another supplementary method such as complement by using a multi-dimensional equation may be used. Further, as for a lack of sensor data, when the predicted value of the correlation coefficient is difficult to be calculated, a point of time when the lacked data is occurred (time when the sensor data is acquired) and the lacked data may be removed to be processed.

FIG. 7 is an exemplary explanation view that adds a correlation coefficient between sensors to sensor data. For instance, there are three types of sensors (sensor #1-#3), and the three sensor data is multi-dimensional time series data. The data analysis processing part 11 selects correlation coefficients of the sensor #1 and the sensor #3, and calculates the correlation coefficient value corresponding to the sensor data temporally. The correlation coefficient and the sensor data are combined based on the corresponding time, and new multi-dimensional time series data is produced. Herein, for explanation, 4-dimensional time series data is obtained by using three types of sensor data and one correlation coefficient, but more types of data may be produced depending on a processing ability of the abnormality sign diagnosing device 3.

Second Embodiment

This embodiment describes an example of a preprocessor 2, which adds a correlation coefficient between selected sensors to sensor data, in an abnormality sign diagnosing device of equipment 4 constituting a gas engine. The gas engine, which is a diagnosis target of an abnormality sign, is provide with a plurality of sensors for measuring, for example, temperature and pressure of lubricating oil, temperature and pressure of cooling water, intake air temperature, average current, average voltage, and the like. Each sensor data is output from each sensor at a certain rate, e.g., at every 30 seconds. The data is transmitted to a data collection server 31 and stored in a collection database 34. When the equipment 4 constituting a gas engine operates continuously for 24 hours, 2880 points of sensor values (24 hour×60 minutes×60 seconds/30 seconds) can be collected in a day.

Figure 8:
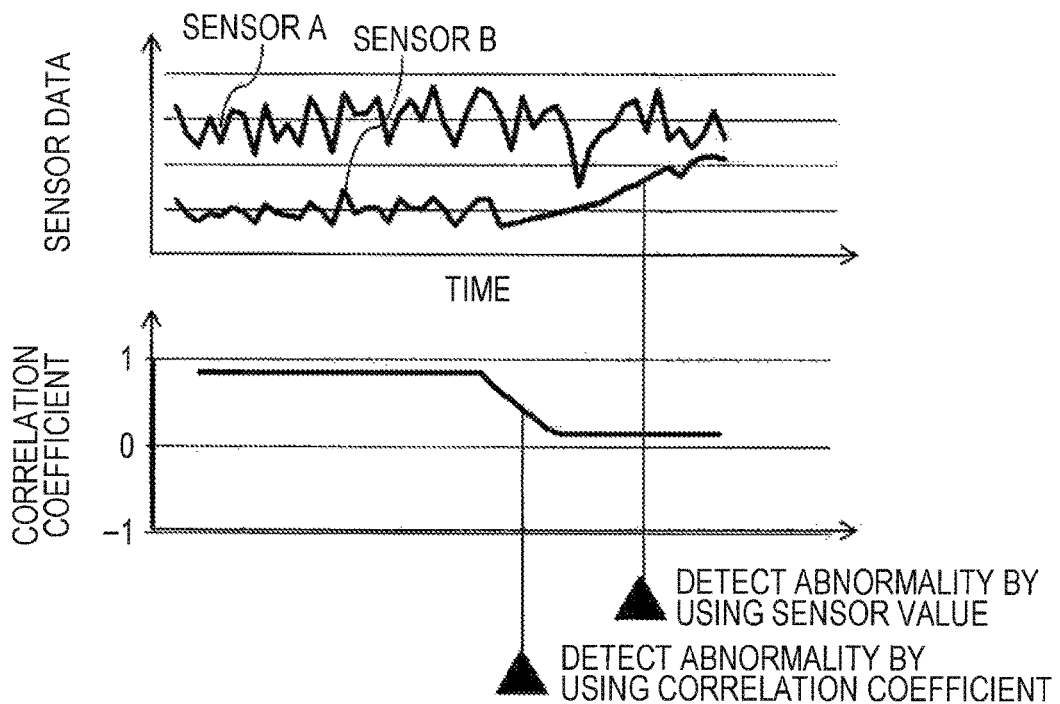
FIG. 8 is a view showing a temporal change in sensor data of a sensor A and a sensor B.

FIG. 8 is a view showing a temporal change in sensor data of a normalized sensor A and sensor B. The end of the sensor data indicates a point of time (time) when failure occurs. Therefore, a period of time from when an abnormality sign is detected to when abnormality is occurred can estimate an effect of sign diagnosis. For instance, the effect is estimated such that the case where an abnormality sign diagnosing device 3 analyzes sensor data to detect an abnormality sign before a certain time from when abnormality is occurred is more effective than the case where abnormality is not detected. Further, the effect is estimated such that the case where an abnormality sign is detected before twice as much time as a certain time from when abnormality is occurred is more effective than the case where an abnormality sign is detected before a certain time from when abnormality is occurred.

Figure 9:
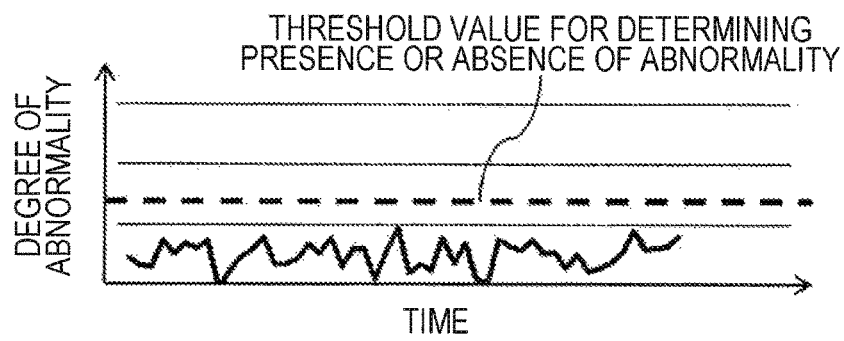
FIG. 9 is an exemplary temporal change in the degree of abnormality.

A diagnosis method of the abnormality sign diagnosing device 3 will be described. The sensor data serving as a diagnosis target has 24 types of sensor data collected at every sampling period of 30 seconds like the sensor A and the sensor B. As learning data indicative of a normally working state, the abnormality sign diagnosing device 3 uses sensor data before a period of time when the diagnosis target data is measured, and then the data is clustered to make a model. The abnormality sign diagnosing device 3 diagnoses the presence or absence of an abnormality sign based on a magnitude of the degree of abnormality that indicates the degree to which the diagnosis data is deviated from the learning data of the model. For instance, FIG. 9 is an exemplary temporal change in the degree of abnormality calculated by this method. The degree of abnormality shown in FIG. 9 doses not exceed a threshold value (dashed line in the view) determined as the presence of an abnormality sign, so that the abnormality sign diagnosing device 3 does not detect the abnormality sign.

Figure 10:
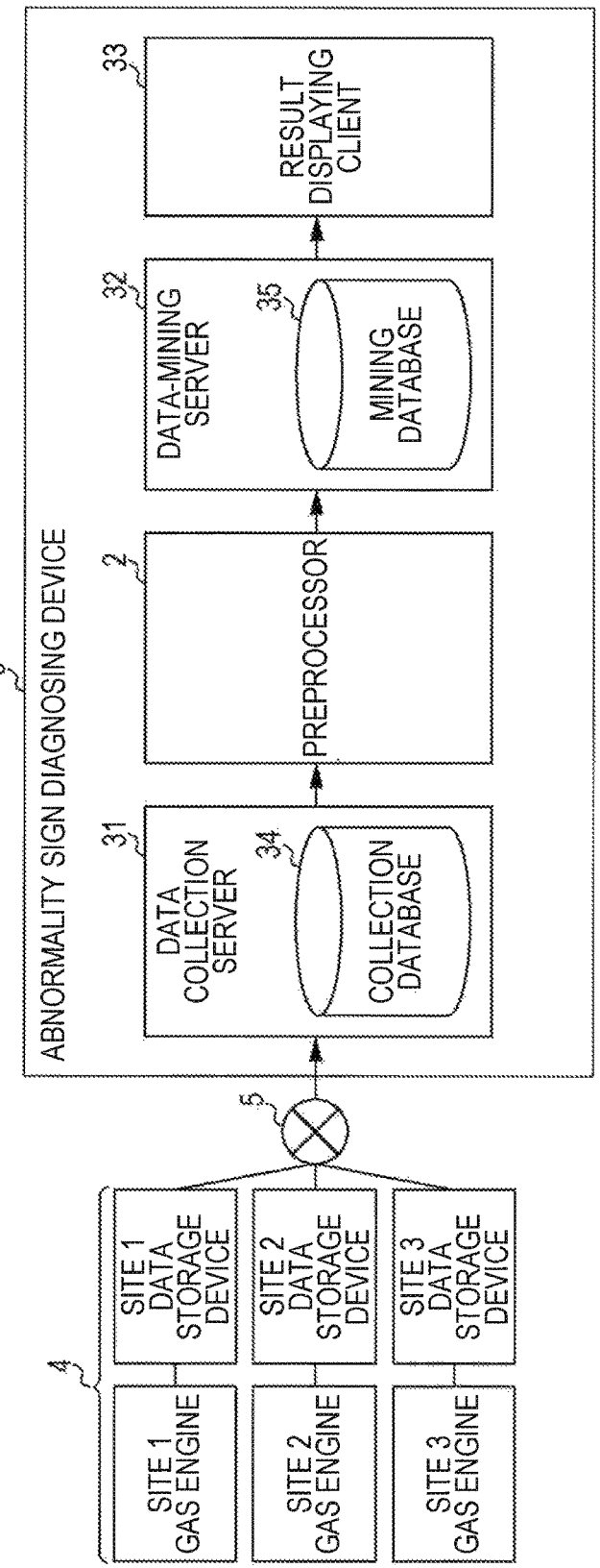
FIG. 10 is an exemplary configuration of an abnormality sign diagnosing system in which a preprocessor is incorporated into the abnormality sign diagnosing device.

FIG. 10 is an exemplary configuration of an abnormality sign diagnosing system that incorporates the preprocessor 2 into the abnormality sign diagnosing device 3. Since the preprocessor 2 uses the collection database 34 of the abnormality sign diagnosing device 3 as a sensor data storage part 10, the preprocessor 2 does not use the sensor data storage database 10 independently. Sensor data is stored in the collection database 34 through a communication network from data storage devices of gas engines in a plurality of sites. Before diagnosing an abnormality sign, the preprocessor 2 selects a correlation coefficient, and then calculates and adds the correlation coefficient value. Subsequently, the abnormality sign diagnosing device 3 determines the presence or absence of an abnormality sign in a state of the gas engine.

Figure 11:
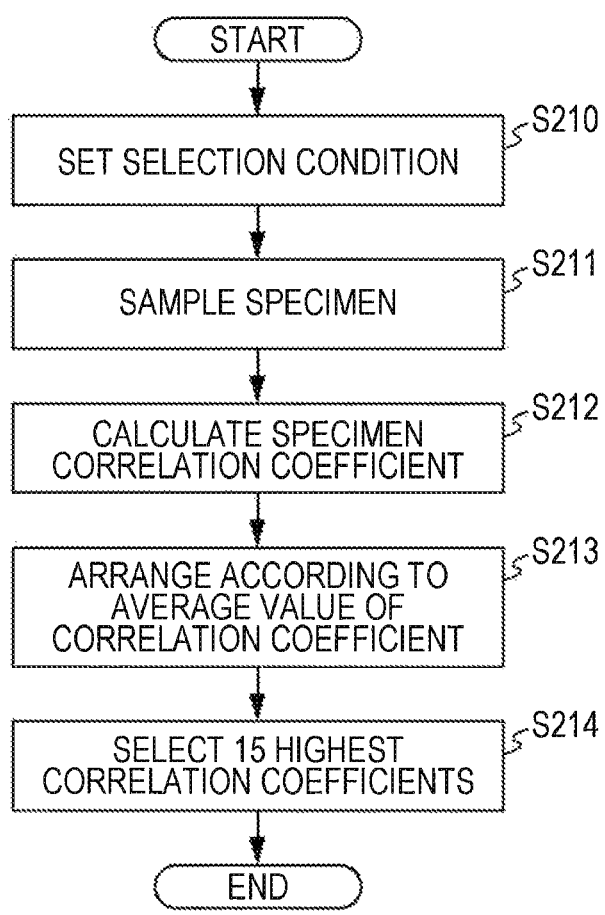
FIG. 11 is a processing flowchart of the data analysis processing part describing a method of selecting a correlation coefficient.

FIG. 11 is a processing flowchart of a data analysis processing part 11 describing a method of selecting a type of correlation coefficient in this embodiment. The data analysis processing part 11 sets up a selection condition (S210). Herein, the condition is determined such that the 15 highest correlation coefficients are selected in order of their strength depending on features of the gas engines. Next, the data analysis processing part 11 extracts specimen data from sensor data (S211), and then calculates a correlation coefficient between the specimen data combined with respect to each sensor and an average value thereof (S212). Based on the calculated average value, the data analysis processing part 11 obtains the order of correlation coefficient strength between the sensors (S213), and selects 15 correlation coefficients among the strongest correlation coefficients (S214).

The data analysis processing part 11 calculates values of the selected 15 correlation coefficients and adds them to sensor data according to time. FIG. 12 is a view describing a data configuration to which the correlation coefficients are added.

Figure 13A:
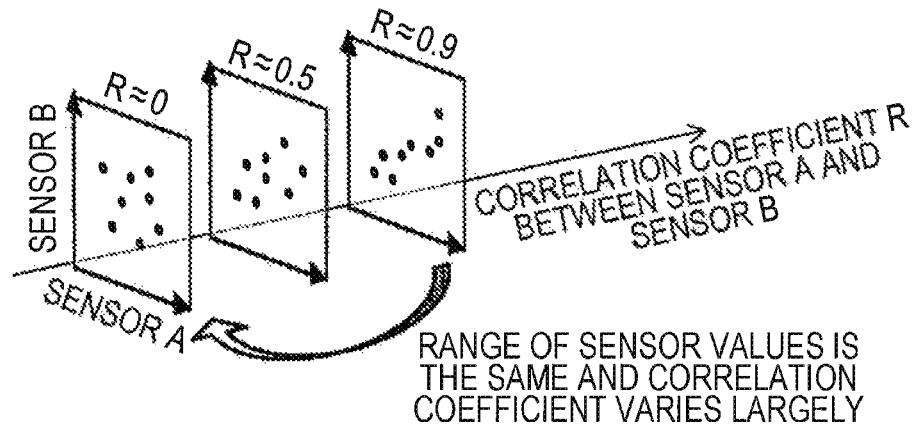
FIGS. 13A and 13B are views describing a diagnostic result of an abnormality sign.
Figure 13B:
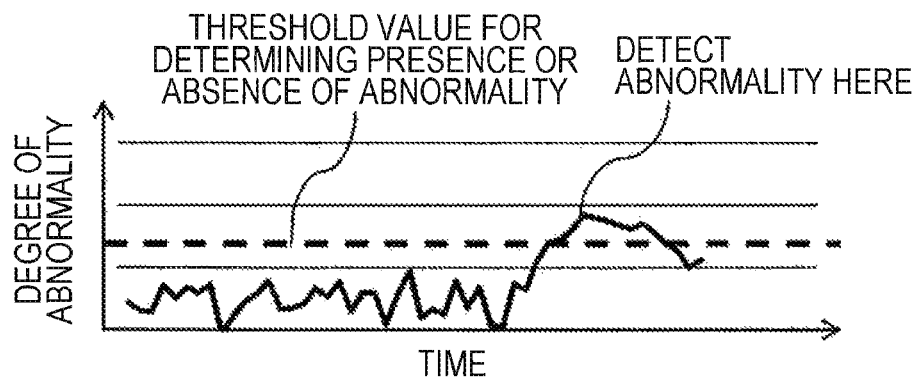

FIG. 13A is a view describing a diagnostic result of an abnormality sign after processing of the preprocessor 2. For instance, when a state of the illustrated equipment changes from R=0.9 to R=0, some abnormalities will occur in the equipment. However, as shown in the view, the ranges of measured values (sensor data) by the sensor A and the sensor B are almost the same, so that this abnormal condition is difficult to be detected. In this case, when a correlation coefficient between both of the measured values is added as a variable, the degree of abnormality is increased by changing the correlation coefficient R from 0.9 to 0 as shown in FIG. 13B, so that the abnormality sign can be detected. The result shown in FIG. 13B shortens detection time of an abnormality sign as compared with the diagnostic result of FIG. 9, by setting up the same determination threshold value. This is the effect of adding variables.

Third Embodiment

In this embodiment, as an example, a case where a preprocessor 2 adds a standard deviation of generated electric power (sensor data) as a variable will be described in terms of sign diagnosis of a gas engine. Even when abnormalities of a device state are difficult to be detected by using sensor data in which a standard deviation is calculated, by inputting the standard deviation of sensor data to an abnormality sign diagnosing device 3, the abnormalities of a device state may be detected. This embodiment corresponds to such a case.

Figure 14:
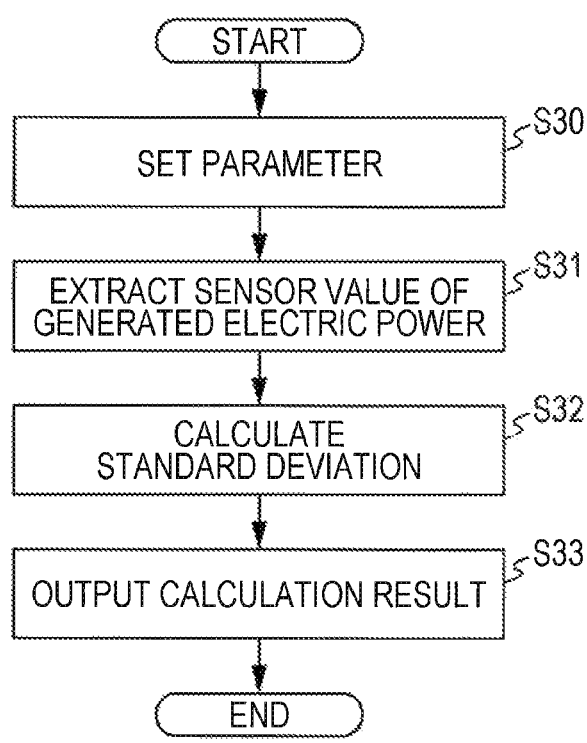
FIG. 14 is a processing flowchart of the data analysis processing part.

FIG. 14 is a processing flowchart of a data analysis processing part 11. Since a type of the added variable is a standard deviation of generated electric power, selection of the variable for calculating the standard deviation is omitted. The data analysis processing part 11 sets a parameter (S30), extracts data of a generated electric power sensor (S31), calculates a standard deviation (S32), and outputs the calculation result (S33).

Figures 15, 16:
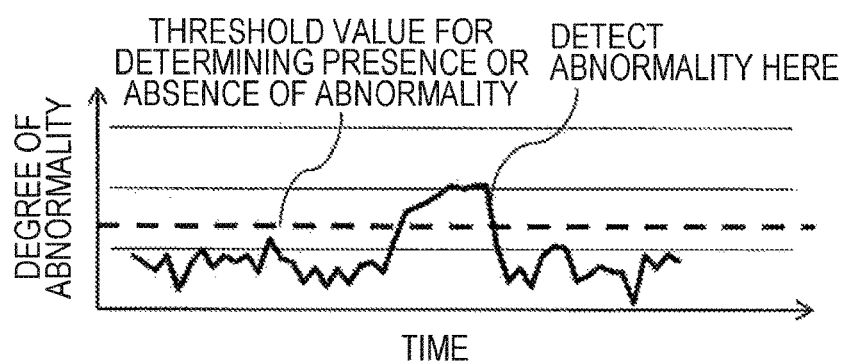
FIG. 15 is exemplary data produced by combining sensor data and a standard deviation thereof, and adding them.
FIG. 16 is an exemplary temporal change in the degree of abnormality.

FIG. 15 is an exemplary data in which the data of generated electric power sensor and the standard deviation are combined to be added and produced. The abnormality sign diagnosing device 3 diagnoses an abnormality sign by using the added and produced data.

FIG. 16 is an exemplary temporal change in the degree of abnormality in which the abnormality sign diagnosing device 3 diagnoses an abnormality sign by using the data in which a standard deviation is added and produced. As for this temporal change in the degree of abnormality, a period of time until an abnormality sign is detected is shortened compared with the temporal change in the degree of abnormality in FIG. 9, when the same determination threshold value is set up.

Note that, an exemplary embodiment is not limited to the above-mentioned embodiments, and various modifications are included. For instance, the above-mentioned embodiments are described in detail in order to explain plainly, and it is not necessarily limited to have all the described elements. Further, elements of one embodiment may partially be replaced with elements of the other embodiment, and elements of the other embodiment may also be added to elements of one embodiment. Furthermore, elements of each embodiment may partially be added to, removed, or replaced with another element.

Further, each configuration, functions, processing methods, and the like, which are mentioned above, may be achieved as software by mounting a system that includes a recording device and a calculation function. For each configuration, functions, processing methods, and the like, which are mentioned above, all or a part of these may be achieved as hardware by, for example, designing with an integrated circuit.

What is claimed is:

1. A preprocessor comprising:
   a first memory that is connected to an abnormality sign diagnosing device and stores multi-dimensional sensor data;
   a first processor that calculates a correlation coefficient between two pieces of sensor data selected from the multi-dimensional sensor data stored in the first memory, extracts a specimen correlation coefficient value from the calculated correlation coefficient, selects the correlation coefficient based on whether either one of an average value and a standard deviation of the specimen correlation coefficient value or a correlation strength order represented by the specimen correlation coefficient value exceeds a threshold value, and calculates a variable value of the selected correlation coefficient;
   a second memory that stores the variable value calculated by the first processor; and
   a second processor that combines the multi-dimensional sensor data stored in the first memory and the variable value stored in the second memory, and outputs the combined result to the abnormality sign diagnosing device.

2. The preprocessor according to claim 1, wherein the multi-dimensional sensor data and the variable value that are combined by the second processor have an identical form.

3. The preprocessor according to claim 2, wherein, when at least one of the multi-dimensional sensor data and data on the variable value that have the identical form and are combined by the second processor is missing, the data corresponding to a time when the data is missing is supplemented or removed.

4. A processing method of a preprocessor that is connected to an abnormality sign diagnosing device and has a first memory and a second memory, the preprocessor performing the processing method comprising:
   calculating a correlation coefficient between two pieces of sensor data selected from the multi-dimensional sensor data stored in the first memory,
   extracting a specimen correlation coefficient value from the calculated correlation coefficient,
   selecting the correlation coefficient as a variable by using either one of an average value and a standard deviation of the specimen correlation coefficient value or a correlation strength order represented by the specimen correlation coefficient value,
   calculating a variable value of the selected variable,
   storing the variable value in the second memory, and
   combining the multi-dimensional sensor data stored in the first memory and the variable value stored in the second memory, and outputs the combined result to the abnormality sign diagnosing device.

5. The processing method of the preprocessor according to claim 4, wherein the multi-dimensional sensor data and the variable value that are combined by the preprocessor have an identical form.

6. The processing method of the preprocessor according to claim 5, wherein, when at least one of the multi-dimensional sensor data and data on the variable value that are combined by the preprocessor having the identical form is missing, the data corresponding to a time when the data is missing is supplemented or removed.

* * * * *